United States Patent [19]
Delaquis et al.

[11] Patent Number: 5,615,607
[45] Date of Patent: Apr. 1, 1997

[54] COOKWARE

[76] Inventors: Michel Delaquis, 134 Horton Avenue West, Winnipeg, Manitoba, Canada, R2C 2G1; Fred Coakes, 543 Harbison Avenue West, Winnipeg, Manitoba, Canada, R2L 0B1

[21] Appl. No.: 685,633

[22] Filed: Jul. 24, 1996

[51] Int. Cl.⁶ .................. A47J 27/00; A47J 27/21
[52] U.S. Cl. .................. 99/409; 99/403; 99/410; 210/464; 210/469; 220/370; 220/372; 220/912
[58] Field of Search .................. 99/339, 340, 403, 99/409–418; 210/464–469; 222/466; 220/324, 354, 367.1, 369, 370, 371, 372, 212.5, 912; 126/369, 20; 294/31.1

[56] References Cited

U.S. PATENT DOCUMENTS

| | | | |
|---|---|---|---|
| 173,766 | 2/1876 | Clements | 220/212.5 X |
| 472,002 | 3/1892 | Ross et al. | 99/410 |
| 817,476 | 4/1906 | Elsner | 99/410 |
| 931,209 | 8/1909 | Lincoln | 99/409 |
| 1,259,183 | 3/1918 | Wildy | 210/469 |
| 1,314,180 | 8/1919 | Ayres | 222/466 X |
| 1,624,926 | 4/1927 | Chovanec | 294/31.1 X |
| 1,781,995 | 11/1930 | Alexander | 210/469 |
| 2,171,982 | 9/1939 | Holbrook | 210/466 |
| 2,907,467 | 10/1959 | Machate, Jr. | 210/469 |
| 3,065,855 | 11/1962 | Edwards | 210/469 |
| 3,269,545 | 8/1966 | Udel | 210/469 |
| 3,289,849 | 12/1966 | Livingston et al. | 210/469 |

Primary Examiner—Timothy F. Simone

[57] ABSTRACT

The present invention relates to a cooking apparatus which is adaptable to facilitate straining requirements. The cooking apparatus comprises of a pot and lid that can be securely integrated to function as a strainer. An outer cover of the lid contains regions of perforation which are gated by an inner element when the cookware is used for traditional cooking. The inner element is easily rotatable to allow for convenient transformation. Mating brackets located along the inner circumference of the pot and the corresponding brackets rimming the curved outer edges of the equatorial plates of the inner element function to integrate the components of the cookware. A knob assembly connecting the elements of the lid controls the positioning of the inner element. The transformation of the cookware is accomplished in one convenient step whereby the knob is depressed and rotated, and the mating brackets are engaged. The contents of the pot are exposed to regions of perforation providing a safe, efficient and convenient method for straining.

20 Claims, 4 Drawing Sheets

COOKWARE

FIELD OF THE INVENTION

This invention relates to the field of cookware. In particular, the present invention relates to cookware adapted to direct the release of steam and provide a system to incorporate a strainer in a lid of cookware for dispensing liquid.

BACKGROUND OF THE INVENTION

The preparation of routine meals commonly includes preparing foods such as vegetables, potatoes and pastas. Traditional cooking methods for such foods involve boiling in water and later draining, thereby employing the use of both a pot and a strainer.

It is known as common practice, when time is limited or a strainer is not available, to employ the lid as a barrier to escaping food and skilfully attempt to dispense the steaming liquid from the pot. This creates a dangerous situation whereby steam and hot liquid escape uncontrollably from the pot. Furthermore, this practice frequently results in the loss of food.

As schedules become busier, the time available for traditional meal preparation becomes less. Consequently, carelessness prevails and meal quality is often sacrificed. In today's fast paced society, there is an ever increasing demand for items that will improve efficiency, promote safety and provide added convenience.

There have been several attempts in the prior art to simplify the art of cooking. Many of which have been directed towards the modification of lids for cookware to eliminate the requirement of a strainer.

For example, Canadian Patent No. 117,162 issued on Apr. 3, 1909, discloses a pot cover adaptable to be effectively used in straining potatoes, vegetables or the like. This invention comprising revolvable elements having passages adapted to be brought into alignment. The passages of the inner element include an area of through passage, an area of large discharge perforations and an area of small discharge perforations. When such passages are aligned with the through passage of the outer element, the straining capabilities of the cover are demonstrated. This invention also discloses the utilization of a secondary knob in the manoeuvring of the outer element and a peripheral flange adapted to sit on the peripheral edge of the pot for positioning of the stationary inner element.

Canadian Patent No. 379,209 issued on Jan. 24, 1939 describes a similar sauce-pan cover adapted to serve as a strainer. This cover includes an outer perforated element, wherein perforations span the diameter of one side of the cover, and an inner element of a rotatable imperforated plate spanning half the diameter of the outer element. This invention also discloses alternative procedures for fastening the cover to the sauce-pan. One method secures the cover to the sauce pan by means of a co-extensive handle counter secured by an interconnecting tongue and lug. Alternatively a combination of spaced clips and a spring clip are used to fit over the head of the sauce pan.

Prior art pot straining systems as described above are not successful in providing a convenient cooking apparatus capable of safely and efficiently straining its contents. These prior art cookware items appear heavy and awkward in their utilization as strainers.

Further, the above referenced patents do not teach a reliable mechanism for securely sealing the cover to the pot. The fastening approach described in the latter patent does not provide a seal and thus allows for escaping steam at the circumference of the lid. In addition, the proposed locking mechanism may prove to be dangerous should the users' grip loosen on the co-extensive handle thus allowing the tongue to slip from the lug thereby causing hot liquid to spill from the sauce-pan. The alternative mechanism employs a spring clip which is released with the rotation of a knob, allowing the cover to "spring off" the sauce-pan. This mechanism is also dangerous since any remaining liquid can splatter from the surface of the cover. This clip-style fastening approach displays an added danger of causing burns, should the user attempt to secure the lid or release the contents while the sauce-pan is hot.

When straining hot liquid from a sauce-pan, it is very important that all elements of the straining utensil remain securely in place in order to avoid sudden splashing. The previously described references do not provide safety features to ensure this security. Consequently, there is a need for cookware that provides a safe and efficient mechanism for in-pot straining and additionally allows for accurate pouring and simple cleaning.

SUMMARY OF THE INVENTION

An object of the present invention is to provide cookware that is adapted to safely drain liquids from the pot using the lid.

Another object of the present invention is to facilitate cooking convenience by providing cookware which is easy to handle, easy to store and easy to clean.

In accordance with one aspect of the present invention there is provided a cooking apparatus, comprising: (a) a container for receiving items to be cooked, said container having a rim surrounding an open region; (b) an outer cover adapted to cover said open region in the container, said outer cover having a region of perforations; (c) an inner element rotatably connected to the outer cover for covering the region of perforations; (d) means for securing the inner element to the container; and (e) control means connected to the outer cover for rotating the inner element relative to the outer cover, said control means being operable between a first and second position; wherein in said first position the inner element is secured to the container by the means for securing and the region of perforations of the outer cover is exposed, whereby the items in the container can be strained; and in said second position the inner element is released from means for securing and the region of perforations in the outer cover is covered by the inner element.

In accordance with another aspect of the present invention there is provided a cooking apparatus, comprising: a pot for receiving items to be cooked; a lid having an outer cover and a rotatable inner element; said outer cover including a region of perforations; said inner element being adapted to cover said region of perforations; interconnecting means of securing the lid to the pot; and a knob assembly connected to said inner element and said outer cover; said knob assembly being operable between a locked position in which the lid is locked to the pot by said interconnecting means and the region of perforations are exposed and an unlocked position in which the lid is released from the interconnecting means and the region of perforations are covered.

BRIEF DESCRIPTION OF THE DRAWINGS

Embodiments of the invention will be described by way of example in conjunction with drawings in which.

DETAILED DESCRIPTION OF THE PREFERRED EMBODIMENTS

Figure 1:
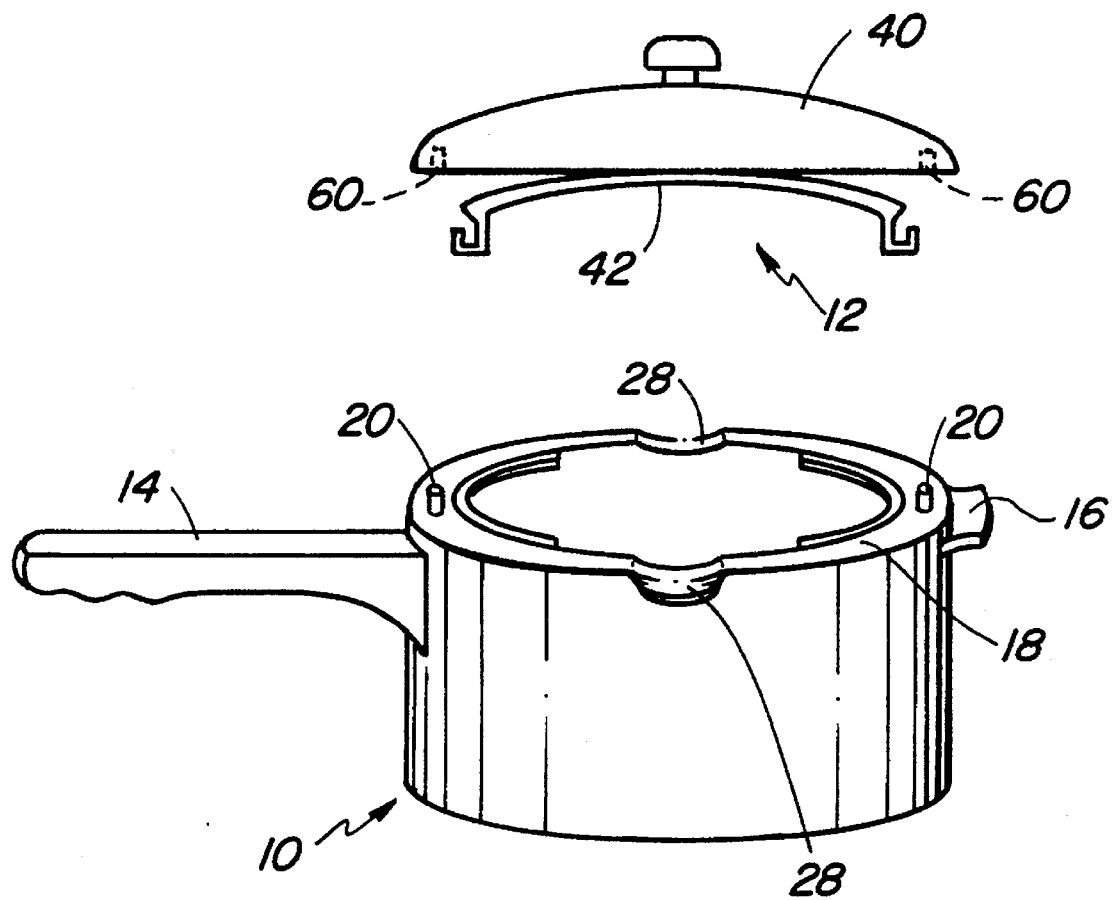
FIG. 1 is a perspective view of the cookware including a pot and a lid shown in an elevated position according to an embodiment of the present invention.
Figure 2:
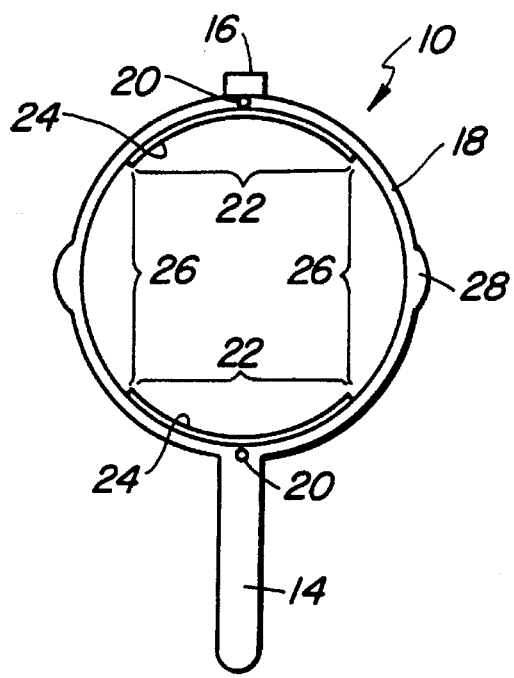
FIG. 2 is a top view of the pot of FIG. 1.

FIG. 1 illustrates a container pot 10 and a strainer lid 12. The pot 10 includes a main handle 14, a secondary handle 16 and an upper rim 18 having two protrusion elements 20 aligned with the handles 14 and 16. The circumferential region within the pot 10 proximate the upper rim 18, as shown in FIG. 2, is divided into a locking region 22 containing a pair of circumferentially extending brackets 24 and a unlocking region 26. The brackets 24 oppose each other and are located symmetrically about the protrusion elements 20 located on the rim 18 of the pot. The pot 10 includes a pair of dipped outer edges 28 located on the upper rim 18 at right angles to the handles 14 and 16.

Figure 3A:
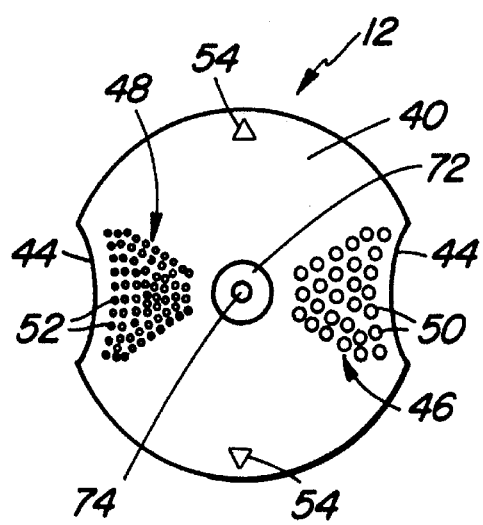
FIG. 3A is a top view of the lid of FIG. 1.
Figure 5:
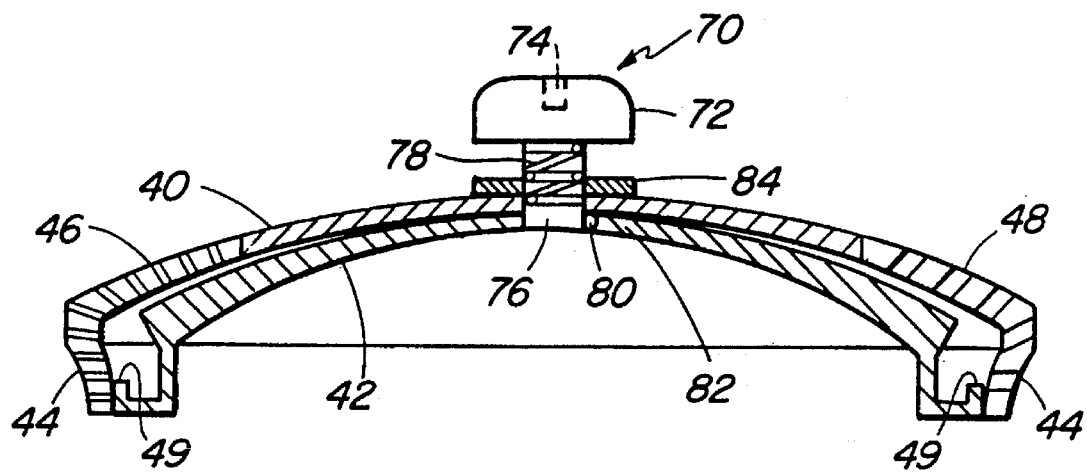
FIG. 5 is a sectional view of the lid of FIG. 1.

The strainer lid 12 includes a domed outer cover 40 and a curved inner element 42. The outer cover 40, shown in top view in FIG. 3A, includes perforation regions 46 and 48 which extend along curved extensions 44, best seen in FIGS. 5 and 6. The curved extensions 44 of the outer cover 40 will fit just inside the pot 10, at the location of the dipped outer edges 28. The perforation regions 46 and 48 taper from the curved extensions 44 proximate to the centre of the outer cover 40. In the embodiment shown in FIG. 3A perforation region 46 contains large apertures 50 and perforation region 48 contains small apertures 52.

Figure 3B:
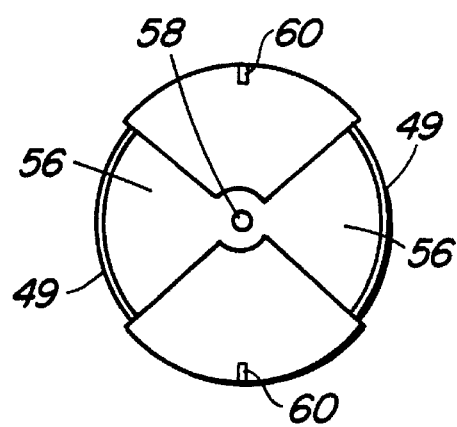
FIG. 3B is a bottom view of the lid shown in FIG. 3A.

The outer cover 40 also includes a pair of opposing orientation markings 54 located at right angles to the central region of the perforation regions 46 and 48. A pair of indentations or slots 60 are located on the outer cover 40 on the opposite side of the orientation markings 54, as illustrated in FIG. 3B.

Figure 4:
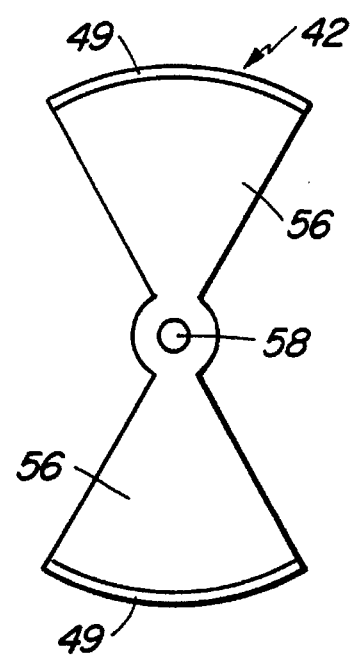
FIG. 4 is a top view of the inner element of the lid shown in FIG. 3B.

The inner element 42, shown detached from the outer cover 40 in FIG. 4, consists of opposing equatorial plates 56 diverging symmetrically from a central origin of rotation 58. A pair of brackets 49 rim the curved outer edges of the plates 56. The outer cover 40 is rotatably connected to the inner element 42 at the central origin of rotation 58 by a knob assembly 70 shown in FIGS. 5 and 6.

The knob assembly 70 includes a knob 72 having a release button 74, a shaft 76 housing a spring 78 and a ball bearing 80 partially protruding from the shaft 76 into a cavity 82 in the inner element 42. A washer 84 is positioned around the shaft 76 and rests on top of the outer cover 40 to prevent damage of the centre region of the outer cover 40 due to the wear of consistent pressure and rotation about the knob assembly 70.

Figure 7A:
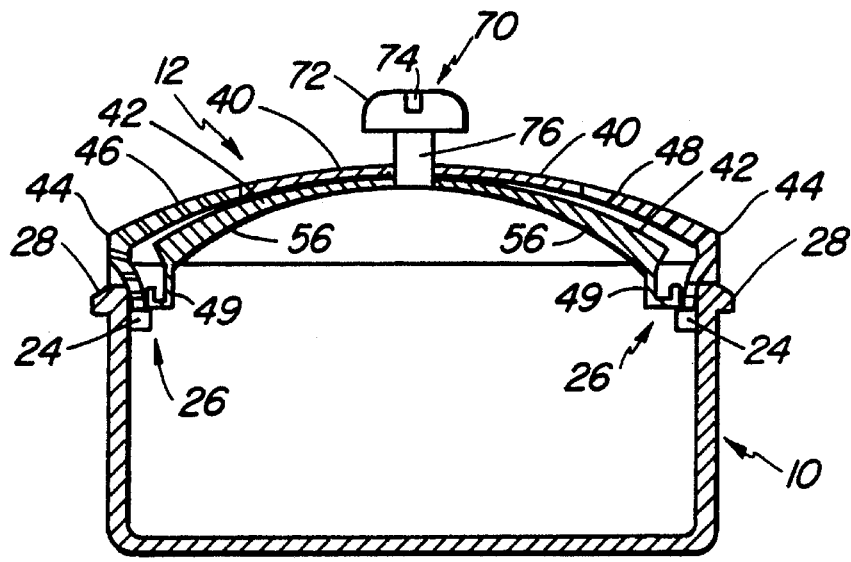
FIG. 7A is a side sectional view of the cookware of FIG. 1 in the unlocked/regular cooking position.

Correct orientation of the lid 12 with the pot 10 is facilitated by the markings 54. When aligned with the handles 14 and 16 of the pot 10, the markings 54 are positioned to allow the indentations 60 to house the protrusion members 20 on the rim 18 of the pot 10. During regular (non-straining) cooking operations the strainer lid 12 is positioned on the pot 10 with the brackets 49 of the inner element 42 positioned within the unlocking region 26 as shown in FIG. 7A. In this non-straining position, the lid 12 can be freely lifted from the pot 10 to monitor the contents within the pot.

Figure 7B:
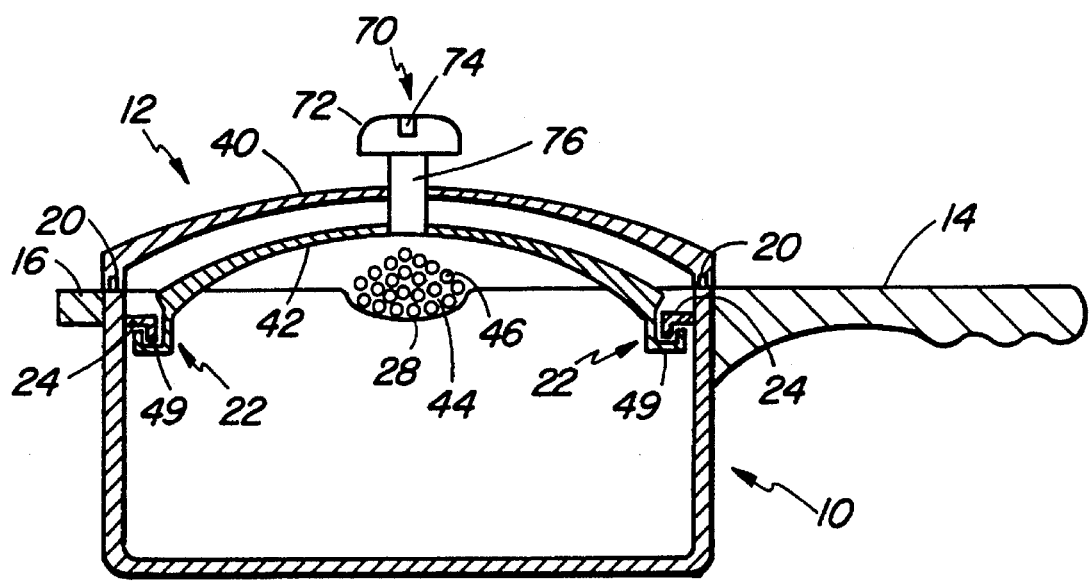
FIG. 7B is a side sectional view of the cookware of FIG. 1 in the locked/straining position.

To employ the straining function of the lid 12, the knob 72 is depressed to separate the inner element 42 from the outer cover 40 and turned such that the brackets 49 of the inner element 42 slide into engagement with the brackets 24 in the locking region 22 of the pot 10, as shown in FIG. 7B. As the knob 72 is released the straining lid 12 is held in place by the upward biasing pressure exerted on the inner element 42 by the spring 78.

With the engagement of the brackets 24 and 49, the equatorial plates 56 of the inner element 42 will be positioned in the locking region 22 thereby exposing the perforation region 46 and 48. The curved extensions 44 of the outer cover 40 will align with the dipped outer edges 28 of the pot 10 to allow for smooth and accurate draining.

To return the pot 10 and lid 12 to the non-straining position, the knob 72 is depressed and turned such that the brackets 49 of the inner element 42 slide out of engagement with the brackets 24 in the pot 10 and move to the unlocking region 26 in the pot 10. Extended within the unlocked region 26, the plates 56 of the inner element 42 cover the perforation regions 46 and 48 while the brackets 49 of the inner element 42 will be positioned against the curved extensions 44 of the outer cover 40 providing a gating effect against the escape of liquids and steam through the perforation regions 46 and 48 of the outer cover 40, while cooking.

To clean the lid 12 the inner element 42 is separated from the outer cover 40 by depressing the release button 74 in the knob 72 of the lid 12 to retract the ball bearing 80 from the cavity 82 to the shaft 76 such that the inner element 42 can freely slide off the shaft 76 of the knob assembly 70. To remount the inner element 42 after cleaning the release button 74 is similarly depressed and the inner element 42 is placed over the shaft 76 and the button 74 is released to extend the ball bearing 80 within the cavity 82 in the inner element 42 to secure the inner element 42 to the shaft 76 of the knob assembly 70.

Figure 6:
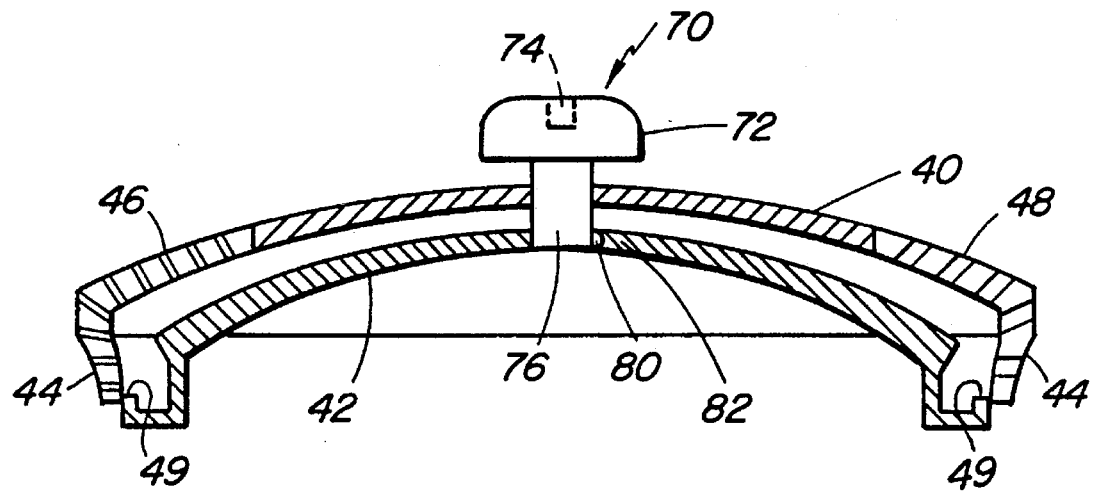
FIG. 6 is a sectional view of a lid, according to an alternative embodiment of the present invention.

An alternative embodiment of the lid is shown in FIG. 6. The inner element 42 and outer cover 40 of the lid 12 are spaced such that by turning the knob 72 the brackets 49 of the inner element 42 engage and disengage from the brackets 24 in the locking region 22 of the pot 10 without the biasing provided by the spring loaded knob of FIG. 5.

The invention claimed is:

1. A cooking apparatus, comprising:

(a) a container for receiving items to be cooked, said container having a rim surrounding an open region;

(b) an outer cover adapted to cover said open region in the container, said outer cover having a region of perforations;

(c) a inner element rotatably connected to the outer cover for covering the region of perforations;

(d) means for securing the inner element to the container; and (e) control means connected to the outer cover for rotating the inner element relative to the outer cover, said control means being operable between a first and second position; wherein in said first position the inner element is secured to the container by the means for securing and the region of perforations of the outer cover is exposed, whereby the items in the container can be strained; and in said second position the inner element is released from the means for securing and the region of perforations in the outer cover is covered by the inner element.

2. The cooking apparatus of claim 1, wherein the means for securing includes a bracket connected to the inside of the container proximate to the rim of the container, said bracket extending along a portion of the circumference of the container; and a corresponding mating bracket connected to the inner element.

3. The cooking apparatus of claim 2, wherein the control means includes a knob assembly connecting the outer cover and the inner element, said knob assembly including a shaft for receiving the outer cover and the inner element and means for releasably retaining the inner element to the shaft.

4. The cooking apparatus of claim 3, wherein the means for releasably retaining the inner element to the shaft includes a retractable member positioned partially within the shaft and partially outside of the shaft to support the inner element, and means for retracting the member wholly within the shaft.

5. The cooking apparatus of claim 4, wherein the means for retracting includes a release button connected to the knob of the knob assembly and operatively connected to the retractable member.

6. The cooking apparatus of claim 5, wherein the retractable member is a ball bearing.

7. The cooking apparatus of claim 6, wherein the knob assembly includes biasing means for providing upward pressure on the inner element relative to the outer cover.

8. The cooking apparatus of claim 7, wherein the biasing means is a compression spring.

9. The cooking apparatus of claim 3, wherein the rim of the container includes a dipped outer edge.

10. The cooking apparatus of claim 9, wherein the outer cover includes a domed circular member having an aperture for receiving the knob assembly, said aperture being located at the centre of the outer cover.

11. The cooking apparatus of claim 10, wherein the outer cover includes a curved extension adapted to fit inside the pot against the inside surface of the pot in alignment with the dipped outer edge.

12. The cooking apparatus of claim 11, wherein the region of perforations in the outer cover includes a first and second opposing section of perforations.

13. The cooking apparatus of claim 12, wherein one of the first and second opposing section of perforations taper from the curved extension to a region proximate the centre of the outer cover.

14. The cooking apparatus of claim 13, wherein the curved extension abuts and is aligned with the brackets of the inner element to block at least one of the first and second opposing section of perforations.

15. The cooking apparatus of claim 13, wherein the first section of perforations include small apertures and the second section of perforations include large apertures.

16. The cooking apparatus of claim 13, wherein the container includes a protrusion element and the outer cover includes an indentation adapted to receive said protrusion element, wherein when the indentation of the outer cover mates with the protrusion element of the container the outer cover is positioned on the container in an unlocked position.

17. The cooking apparatus of claim 15, wherein the outer cover includes at least one orientation marking located on the opposite side of a corresponding indentation of the outer cover, whereby the orientation marking is used to align the indentation of the outer cover with the protrusion element of the container.

18. The cooking apparatus of claim 2, wherein the inner element comprises a pair of opposing equatorial plates diverging symmetrically from a central origin of rotation.

19. The cooking apparatus of claim 2, wherein the container includes a non-stick cooking surface.

20. A cooking apparatus, comprising:
(a) a pot for receiving items to be cooked;
(b) a lid having an outer cover and a rotatable inner element;
    said outer cover including a region of perforations;
    said inner element being adapted to cover said region of perforations;
(c) interconnecting means of securing the lid to the pot; and
(d) a knob assembly connected to said inner element and said outer cover; said knob assembly being operable between a locked position in which the lid is locked to the pot by said interconnecting means and the region of perforations are exposed and an unlocked position in which the lid is released from the interconnecting means and the region of perforations are covered.

* * * * *